United States Patent [19]

Sallis

[11] 4,106,794
[45] Aug. 15, 1978

[54] MULTIPLE BAR LINKAGE TOWING SYSTEM

[76] Inventor: Daniel V. Sallis, 5720 Blue Sage Dr., Littleton, Colo. 80123

[21] Appl. No.: 611,318

[22] Filed: Sep. 8, 1975

[51] Int. Cl.² ............................................. B62D 53/00
[52] U.S. Cl. ............................. 280/456 R; 280/446 R
[58] Field of Search ............... 280/456 R, 446, 461 A, 280/460 A, 492, 478 R

[56] References Cited

U.S. PATENT DOCUMENTS

| 2,393,358 | 1/1946 | Ferguson | 280/461 R |
|---|---|---|---|
| 3,643,976 | 2/1972 | Haupt | 280/478 R |
| 3,787,068 | 1/1974 | Miller | 280/456 R |
| 3,790,191 | 2/1974 | Gallatin | 280/456 R |
| 4,019,754 | 4/1977 | Hinckley | 280/456 R |

FOREIGN PATENT DOCUMENTS 166,982  3/1950  Fed. Rep. of Germany ........... 280/492

*Primary Examiner*—Joseph F. Peters, Jr.
*Assistant Examiner*—R. Schrecengost

*Attorney, Agent, or Firm*—Sheridan, Ross, Fields & McIntosh

[57] ABSTRACT

The apparatus of the invention substantially accomplishes the functions of a so-called "fifth wheel coupler" which provides a pivotal mounting for the forward end of a trailer tow bar on the center line of the towing vehicle and directly above its rear axle. The apparatus includes forward hitch means on the aft portion of the towing vehicle carrying first attachment members at the aft end of the vehicle, and aft hitch means on the forward portion of the trailer carrying second attachment members at the forward end of the trailer. Tow bars are pivotally connected at their fore and aft ends to the first and second attachment members which are so located and spaced that there are tow bars spaced laterally and vertically and they all converge forwardly so that their extended axes substantially meet at a location adjacent to the center line of the towing vehicle and also adjacent to its rear axle to define a virtual or instantaneous pivot point which puts the trailer imposed vertical and side loads at the rear wheels of the towing vehicle to minimize lateral sway and vertical "teeter tottering" of the trailer.

6 Claims, 19 Drawing Figures

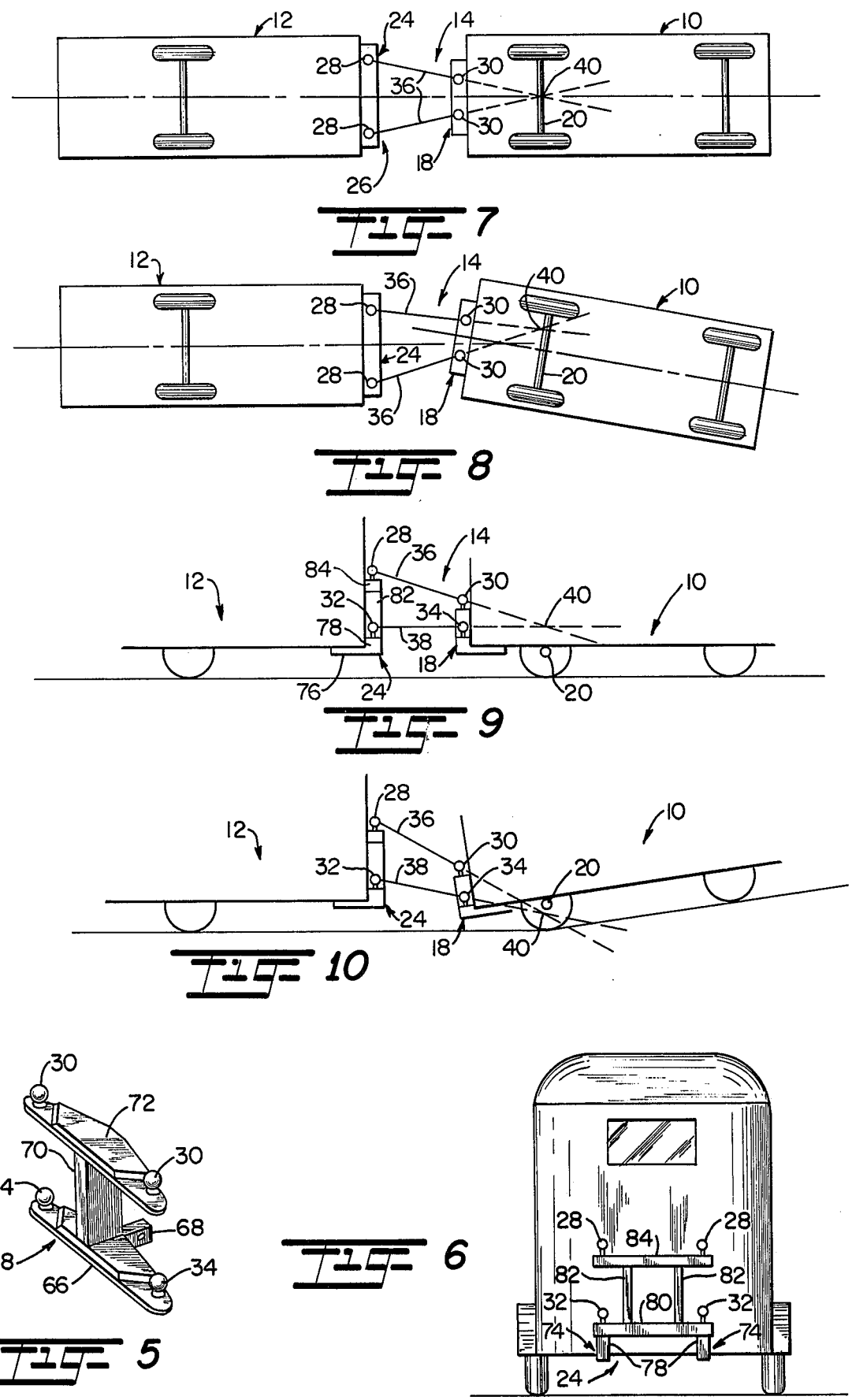

MULTIPLE BAR LINKAGE TOWING SYSTEM

BACKGROUND OF THE INVENTION

This invention lies in the field of towing apparatus for connecting the forward portion of a trailer mounted on road wheels to the aft portion of a towing vehicle. It is directed to such apparatus for towing the type of trailer which has only one wheel at each side or two wheels so closely spaced fore and aft that it is not stable in pitch and must rely on a vertical load relationship with the towing vehicle to maintain its proper attitude. It is more particularly directed to such apparatus in which the towing linkage is connected at the aft end of the towing vehicle but functions as if it were connected directly above the rear axle of the vehicle.

Presently "two wheel" type trailers, including those which have two wheels closely spaced fore and aft at each side, are coupled to the tow vehicles by means of a longitudinal tongue fixedly connected to the trailer and connected at its forward end to the rear of a towing vehicle with a ball joint or other type of pivotal device.

For special purpose towing vehicles such as a truck tractor, and also with the conventional type of pickup truck, there is clear space directly above the rear axle, and a pivotal mounting may be readily secured at such location. The forward end of the tongue is connected to the pivotal mounting to form what is commonly referred to as a fifth wheel type coupling. Since this is the only connection between the vehicles, all of the force components between them pass through the pivot point. Thus all pitching and swaying loads of the trailer are transmitted through the pivot directly in the rear wheel area and the trailer follows the rear wheels in turning situations, all of which is highly desirable.

However, for non-specialized towing vehicles such as passenger cars which are very commonly used for towing horse trailers and travel trailers, this arrangement is not practical because the pivotal mounting would be located directly in the trunk, making it unusual for storing baggage and preventing closing of the trunk lid. Consequently the pivotal mounting is located outside of the car at the aft end, usually just behind the rear bumper. Thus there is a considerable overhang aft of the rear axle amounting to as much as four feet or more. The trailer imposed loads at this point produce a very pronounced leverage effect about the rear wheels, enhancing lateral sway and vertical bounce.

SUMMARY OF THE INVENTION

The present invention overcomes the difficulties mentioned above and provides a system which utilizes mounting means outside of the car body while attaining substantially the same results as a fifth wheel coupling by producing a virtual or instantaneous pivot point for both lateral and vertical force components which remains close to the rear axle of the towing vehicle under normal operating conditions.

Generally stated, the system which incorporates the features of the invention includes forward hitch means carried by the towing vehicle aft of the rear axle including a plurality of first attachment members at the aft end of the vehicle arranged in vertically and laterally spaced relation, and aft hitch means carried by the forward portion of the trailer including a plurality of second attachment members at the forward end of the trailer and arranged in vertically and laterally spaced relation in the same general pattern as the first attachment members.

A multiple tow bar linkage extends fore and aft between the two hitch means and each tow bar is pivotally connected to a set of first and second attachment members. These members are so located vertically and laterally that all of the tow bars converge forwardly, and their extended axes beyond the first attachment members substantially meet at a location close to the center line of the vehicle and to the rear axle. This substantial intersection constitutes a virtual or instantaneous pivot point about which pitching and swaying movements take place just as though it were an actual physical connection. Thus the trailer follows and reacts on the rear road wheels of the towing vehicle rather than the central aft end of the vehicle and practically eliminates the leverage effect previously mentioned.

When a pitching motion occurs as when one of the vehicles is on an incline while the other is horizontal the virtual pivot point moves slightly vertically but remains close to the rear axle and thus the pitching force is slight. When the towing vehicle travels in a turn, producing a horizontal angle with respect to the trailer, the virtual pivot point moves slightly laterally but remains close to the rear axle and the lateral force component of the trailer is applied to the rear wheels rather than the aft end of the towing vehicle. Although the best results are obtained if the extended axes of the tow bars meet precisely at a given point, the system operates quite satisfactorily if they all pass close to a common point. When the same set of bars and hitches is applied to cars with different amounts of overhang the virtual pivot point necessarily shifts longitudinally with respect to the rear axles of the various cars but only to a slight extent so that the desired functions are still attained.

BRIEF DESCRIPTION OF THE DRAWINGS

Various other advantages and features of novelty will become apparent as the description proceeds in conjunction with the accompanying drawings, in which:

FIG. 5 is a perspective view of the forward hitch means of FIGS. 1 and 2;

FIG. 6 is an end elevational view of the trailer with a suitable hitch means;

FIG. 7 is a diagrammatic plan view of the apparatus of FIGS. 1 and 2 showing the relation of the working parts;

FIG. 8 is a view similar to FIG. 7 showing the action of the linkage in a turning movement;

FIG. 9 is a side elevational view of the apparatus of FIGS. 7 and 8;

FIG. 10 is a diagrammatic elevational view of the apparatus of FIG. 9 showing the action of the linkage in a pitching motion;

DESCRIPTION OF PREFERRED EMBODIMENTS

Figure 1:
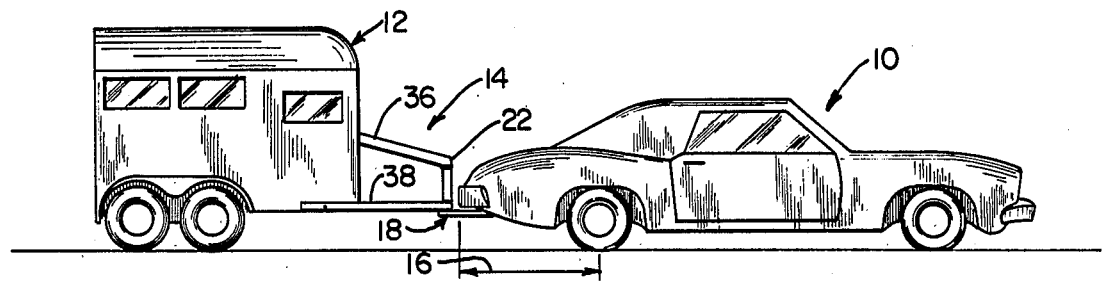
FIG. 1 is a diagrammatic side elevational view of a towing vehicle and a trailer coupled with one form of the apparatus of the invention.
Figure 2:
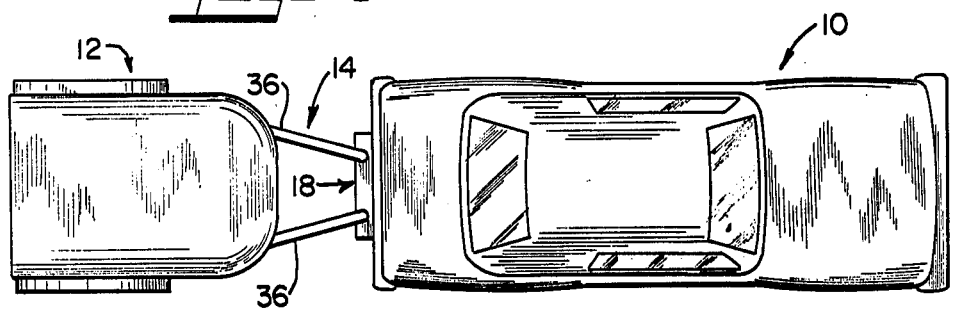
FIG. 2 is a plan view of the vehicles and coupler of FIG. 1.

A typical construction and installation of a towing apparatus incorporating the features of the invention is diagrammatically illustrated in FIGS. 1 and 2, in which a towing vehicle 10 shown as a standard passenger car is coupled to a trailer 12 by means of the towing system or apparatus 14. The trailer is of the type referred to as a "two wheeler" because even though it has two ground wheels on each side they are closely spaced fore and aft and the trailer does not have pitching stability. It must be connected to the towing vehicle in such manner as to achieve a vertical load reaction between them.

The conventional coupling system comprises an attachment bracket rigidly connected to the aft portion of the car and extending aft of its rear bumper with a pivot mounting, such as a ball, on the center line, and an elongate tongue fixedly connected to the forward portion of the trailer and provided at its free end with a socket to engage the pivot ball. The trailer is so designed and loaded as to apply a continual down force on the pivot ball and thus on the car, and its stability depends on this force and connection. It will be apparent from FIG. 1 that the overhang 16 from the rear axle to a point aft of the bumper is a substantial proportion of the length of the car and may amount to as much as four feet or more. Hence any swaying or pitching of the trailer in response to travel conditions exercises great leverage about the rear wheels of the car and makes the driving both difficult and dangerous.

One form of the towing system is shown generally in FIGS. 1 and 2 and more specifically in FIGS. 7 to 9. Forward hitch means 18 is connected to the under side of the towing vehicle aft of the rear axle 20 and includes first attachment members 22 spaced vertically and laterally. The trailer is provided with aft hitch means 24 secured to the forward portion of the trailer and carrying second attachment members 26 also spaced vertically and laterally in a pattern corresponding to the pattern of the first attachment members but the spacing is greater in both directions.

Considering FIGS. 7 and 9, it will be seen that there are four attachment members on the trailer and four on the towing vehicle. Upper members 28 are located at opposite sides of the center line or axis of the trailer and are spaced farther apart than the corresponding members 30 on the towing vehicle. Lower members 32 are directly below members 28 and lower members 34 are directly below members 30. As seen in FIG. 9, the vertical spacing between members 28 and 32 is greater than the vertical spacing between members 30 and 34. The multiple bar linkage connecting the towing vehicle to the trailer includes four elongate tow bars 36 and 38 provided at their ends with conventional means to connect them to the attachment members.

When they are secured in position as in FIGS. 7 and 9 it will be seen that bars 36 lie in an upper lateral plane and bars 38 lie in a lower lateral plane, and the two planes converge forwardly and meet along a line adjacent to the vertical plane containing the lateral axis of the rear axle. In addition bars 36 converge forwardly and bars 38 converge forwardly so that the extended axes of all of the bars substantially meet at a location generally coincident with the axis of the towing vehicle and with the line of juncture of the lateral planes. Thus they define a virtual pivot point 40 for vertical and lateral swinging adjacent to the rear axle instead of behind the rear bumper and the force components of relative motion are transmitted to the rear wheels instead of the aft end of the vehicle. The bars are free of restraint against vertical and lateral swinging movement and the trailer follows and reacts with the rear wheels in the same way as it would with a fifth wheel coupler.

The condition when the vehicles are misaligned as in a towing turn or in parking is illustrated in FIG. 8. The horizontal angular relation between the tow bars changes and the virtual pivot point 40 moves slightly laterally and aft, but it is still close to the rear axle and the beneficial functions are only slightly affected. The condition when the vehicles are misaligned in a pitching sense is illustrated in FIG. 10, where the trailer is on level ground and the towing vehicle is on an upward incline. The vertical angular relation between the tow bars changes and the virtual pivot point 40 moves slightly down and aft without noticeably affecting the functions. Similar vertical misalignment in the opposite direction, of course, moves the virtual pivot point slightly upward and aft.

Figure 3:
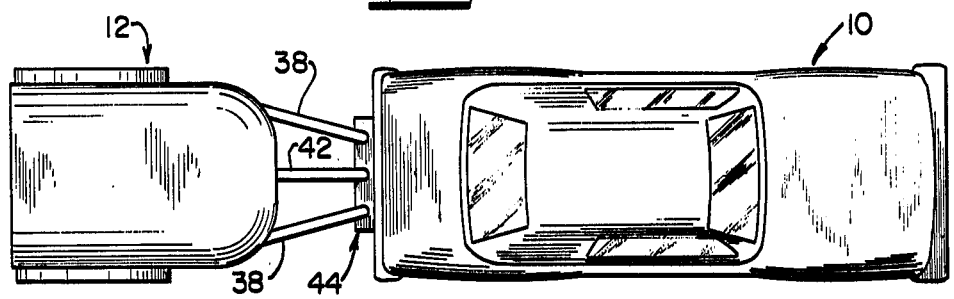
FIG. 3 is a view similar to FIG. 2 showing a modification.
Figure 11:
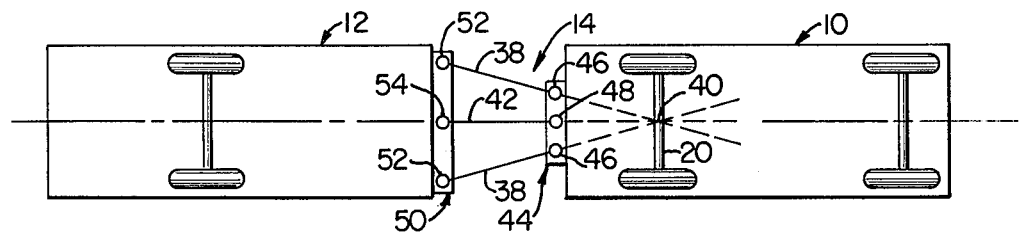
FIG. 11 is a plan view similar to FIG. 7 showing the modification of FIG. 3.

The system shown in FIGS. 3 and 11 is basically the same as that of FIGS. 7 to 10, the difference being that a single tow bar 42 replaces tow bars 36 and it is located on the center line of the two vehicles when they are aligned in normal towing position. It lies in the same lateral plane which contained bars 36 and therefore it converges to the virtual pivot point 40 and the desired functions are carried out in the same way as with the four bar linkage. The single bar and the double bars may be in either of the lateral planes but it is preferable for structural and other reasons to locate the single bar in the upper plane. The forward hitch means 44 includes two lower attachment members 46 for bars 38 and an upper attachment member 48 for bar 42. The aft hitch means 50 includes two lower attachment members 52 for bars 38 and an upper attachment member 54 for bar 42.

Figure 4:
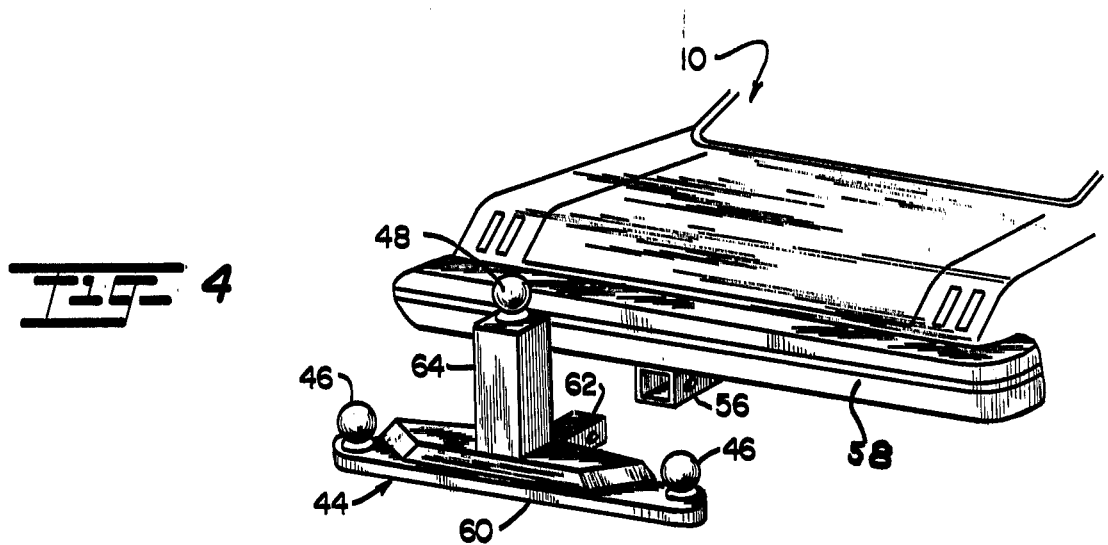
FIG. 4 is a perspective view of a towing vehicle and the forward hitch means of FIG. 3.

A very satisfactory configuration for hitch means 44 is shown in FIG. 4. A standard square tubular hitch frame 56 is rigidly secured to the under side of the aft portion of car 10 and extends to about the rear side of bumper 58. The hitch means 44 constitutes a supporting bracket comprising a transverse bar 60 with a central forwardly extending mounting shaft 62 adapted to telescope into the hitch frame 56 and be secured thereto and a central vertically extending mast 64. Attachment members 46 are secured to each end of bar 60 and attachment member 48 is secured to the upper end of mast 64. They are shown as ball type mounts for cooperation with sockets carried at the ends of the tow bars for simplicity of illustration, but double clevis joint pivotal connections may be used if desired.

A similar construction may be used for the four bar system as shown in FIG. 5. The hitch means 18 constitutes a supporting bracket comprising lower transverse bar 66 with a central forwardly extending mounting shaft 68 adapted to telescope into hitch frame 56 and be secured thereto and a central vertically extending mast 70 with an upper transverse bar 72 secured thereto. Attachment members 30 are secured to each end of bar 72 and attachment members 34 are secured to each end of bar 66. Double clevis joint pivotal connections may also be substituted in this arrangement.

A suitable configuration for aft hitch means 24 is shown in FIGS. 6 and 9. A pair of generally L-shaped supports 74 have horizontal legs 76 secured to the under side of the trailer and short upstanding legs 78 at the forward end of the trailer. A transverse bar 80 is secured to both of legs 78, and vertical legs 82 are secured to bar 80. A second transverse bar 84 is secured to the upper ends of legs 82 to complete the framework. Attachment members 28 are secured to the ends of bar 84 and attachment members 32 are secured to the ends of bar 80. In the case of a three bar linkage, a central attachment member may be secured to the mid point of bar 84 or bar 80. Again, double clevis joint connections may be used if desired.

Figure 12:
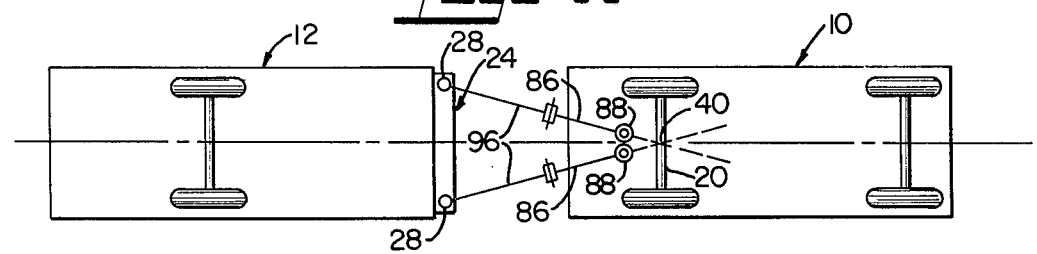
FIG. 12 is a diagrammatic plan view showing a further modification.
Figure 13:
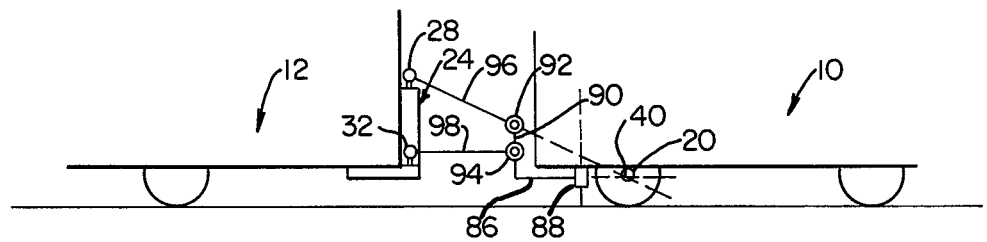
FIG. 13 is a side elevational view of the apparatus of FIG. 12.

In order to reduce the lateral travel of the virtual pivot point, the linkage of FIGS. 7 to 9 may be modified as illustrated in FIGS. 12 and 13. The effective lengths of the lower links are increased to provide lateral pivot points close to the rear axle. To achieve this, mounting members 86 extend forwardly beneath the aft portion of vehicle 10, and each member is pivotally connected by mounting 88 to the under side for swinging laterally only about a generally vertical axis. Each mounting member is L-shaped to provide a generally vertically extending mounting post 90 to which are secured attachment members 94 and 92.

Upper tow bars 96 are connected at their aft ends to attachment members 28 and at their forward ends to attachment members 92 while the lower tow bars 98 are connected at their aft ends to attachment members 32 and at their forward ends to attachment members 94. The connections to the forward lower members are all single hinge, arranged so that the bars can swing vertically only about generally horizontal axes. The net effect is that the tow bars and the mounting members swing laterally as units about pivot mountings 88 while the bars swing vertically about attachment members 92 and 94. Thus, the virtual pivot point 40 moves only very slightly laterally in response to turning movements.

Figure 14:
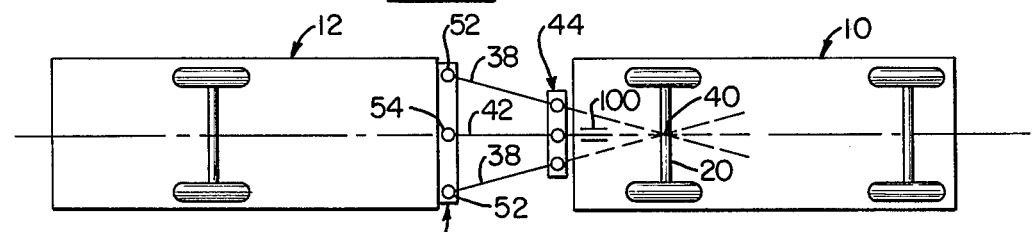
FIG. 14 is a diagrammatic plan view showing another modification.
Figure 15:
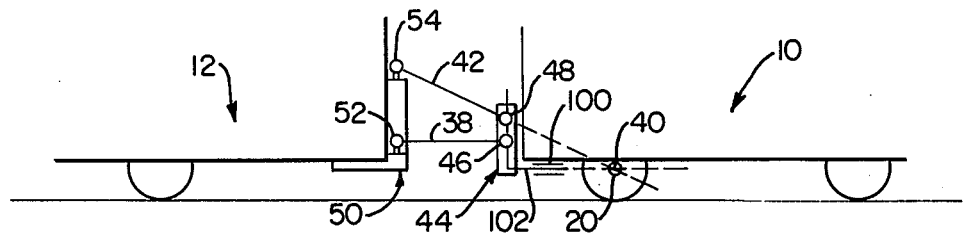
FIG. 15 is a side elevational view of the apparatus of FIG. 14.

Another variation of the forward mounting arrangement is illustrated in FIGS. 14 and 15, which show a bracket and tow bar arrangement substantially the same as that of FIG. 11. However, the hitch frame 56, shown in FIG. 4, is replaced by hitch frame 100 formed with a longitudinal journal bearing and shaft 62 is replaced by cylindrical shaft 102 which is mounted in the bearing for rotation about a longitudinal axis. With the rigid connection of FIGS. 4 and 11, a pitching load during a sharp turn will be applied at a point displaced toward one side of the towing vehicle. Preferably, all of the attachment members, or a minimum of one set on one bar, must be restrained in torsion by a pin or other suitable means. With the swivel connection of FIGS. 14 and 15 the result will be that there are no torsional forces transmitted from the trailer to the vehicle because of lateral movement of point 40. Also, there will be only a slight rotation of shaft 102 in frame 100, and the downward force will remain on the center line of the towing vehicle. In a variant, members 62 and 56 of FIG. 4 may be retained, and member 62 may be journaled about a fore and aft axis in the bottom part of bracket 44.

Figure 16:
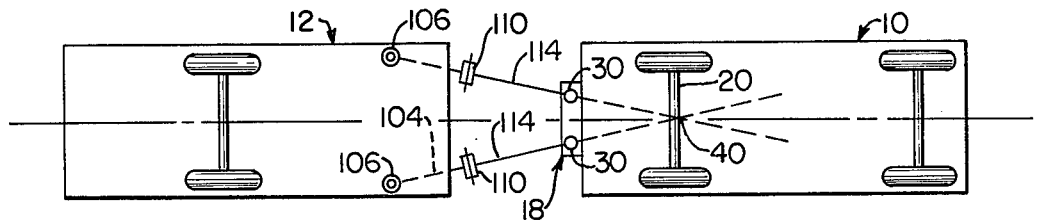
FIG. 16 is a diagrammatic plan view of an additional modification.
Figure 17:
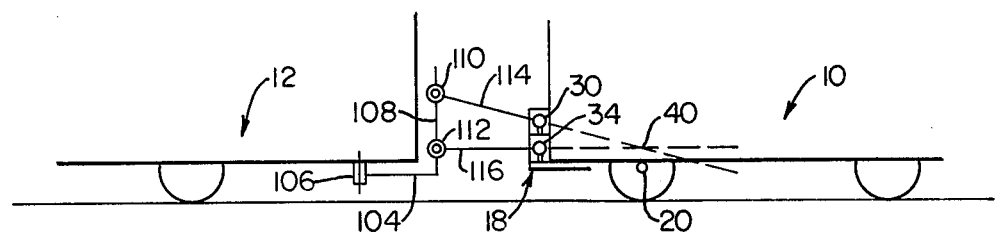
FIG. 17 is a side elevational view of the apparatus of FIG. 16.

The long swivel arm advantage of the apparatus of FIGS. 12 and 13 may be substantially obtained with the modification of FIGS. 16 and 17. In this case mounting members 104 extend aft beneath the forward portion of the trailer and each member is pivotally connected by mounting 106 to the underside for swinging laterally only about a generally vertical axis. Each mounting member is L-shaped to provide a generally vertically extending mounting post 108 to which are secured attachment members 110 and 112.

Upper tow bars 114 are connected at their aft ends to attachment members 110 and at their forward ends to attachment members 30 while the lower tow bars 116 are connected at their aft ends to attachment members 112 and at their forward ends to attachment members 34. The connections to the aft lower members are all single hinge, arranged so that the bars can swing vertically only about generally horizontal axes. Thus the long swivel arm effect is almost the same as that of the apparatus of FIGS. 12 and 13.

Figure 18:
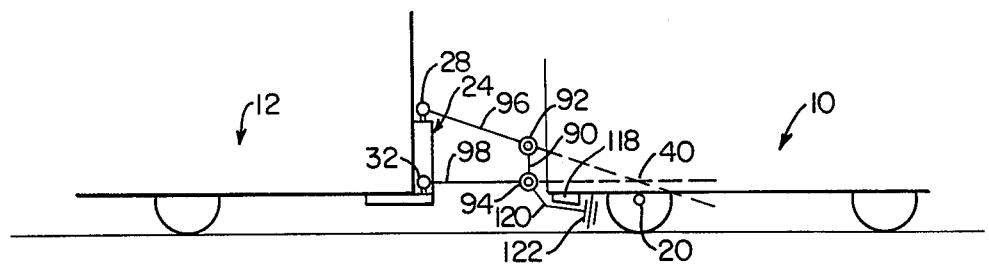
FIG. 18 is a diagrammatic side elevational view of a still further modification.

Vehicle and ground clearance are sometimes problems with the apparatus of FIGS. 12 and 13. The problems can be substantially alleviated with the modification of FIG. 18. Vehicle 10 is shown as having an obstruction 118, which may be the fuel tank. Mounting members 86 of FIG. 13 are replaced by mounting members 120 which slope downwardly and forwardly from posts 90 with an intermediate bend to provide constant clearance for the obstruction and are pivotally connected to mountings 122 for rotation laterally only about an axis which is inclined upwardly and forwardly. The upwardly bent aft portion of member 120 provides adequate clearance for relatively great pitching movements.

Figure 19:
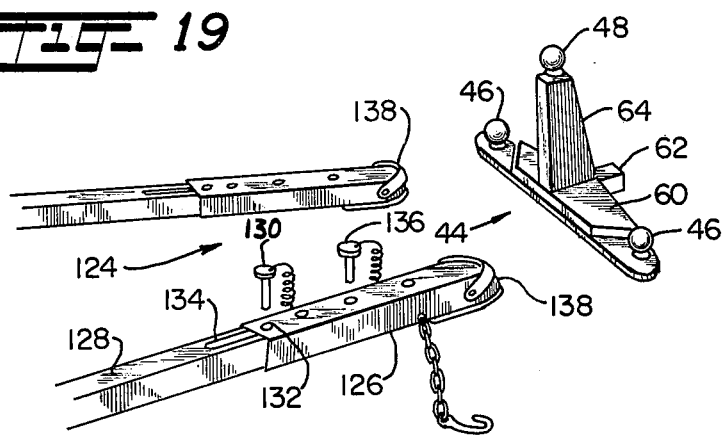
FIG. 19 is a perspective view of the adjustable tow bars of the invention.

To increase the ease of making a connection, or "hookup", of the towing vehicle, the two bars may be made in telescoping form as shown in FIG. 19. Each tow bar 124 comprises a foward section 126 and an aft section 128 which telescopes within it for extension and retraction. A pin 130 passes through aperture 132 in section 126 and an elongate slot 134 in section 128 to limit extension and prevent separation. A similar pin 136 may be inserted in any of the other apertures to adjust the desired fixed length for a towing operation. Standard socket devices 138 are provided at each end of each bar for connection to the standard attachment members.

The advantage of the construction just described is that the towing vehicle need not be perfectly lined up with the trailer in order to make a hookup. It is only necessary to back it into a position close to the trailer. The individual bars are then extended to varying lengths and connected to the forward hitch means. The towing vehicle is moved forward a short distance to bring the trailer into alignment and then backed until the two bars are all fully retracted, after which pins 136 are inserted and the two bars are in condition for the towing operation.

What is claimed is:

1. Towing apparatus for connecting the forward portion of a trailer mounted on road wheels to the aft portion of a towing vehicle having a laterally extending rear axle located well forward of the aft end of the vehicle and having road wheels connected to the ends of the axle, comprising:

forward hitch means carried by the body of the towing vehicle aft of the rear axle including a plurality of longitudinally extending mounting members connected at their forward ends to the body of the vehicle for swinging laterally only about a generally vertical axis, and at least one first attachment member connected to the aft end of each mounting member rearward of the aft end of the vehicle;

aft hitch means carried by the forward portion of the trailer including a plurality of second attachment members located substantially at the forward end of the trailer;

the first attachment members being located substantially in a generally upright and laterally extending plane and being spaced vertically and laterally in a predetermined pattern;

the second attachment members being located substantially in a generally upright and laterally extending plane in a pattern corresponding generally with the pattern arrangement of the first attachment members but with greater vertical and lateral spacing;

and a multiple tow bar linkage extending between the trailer and the towing vehicle including upper and lower elongate bars extending longitudinally between corresponding first and second attachment members, mounted at their forward ends to the first attachment members for swinging vertically only about a lateral axis, and mounted at their aft ends to the second attachment members for swinging vertically and laterally;

all of the attachment members being so located vertically and laterally that all of the tow bars connected thereto converge forwardly to define a virtual pivot point adjacent to the longitudinal axis for vertical and lateral swinging well forward of the aft end of the vehicle.

2. Towing apparatus for connecting the forward portion of a trailer mounted on road wheels to the aft portion of a towing vehicle having a laterally extending rear axle located well forward of the aft end of the vehicle and having road wheels connected to the ends of the axle, comprising:

forward hitch means carried by the towing vehicle aft of the rear axle including a plurality of first attachment members located substantially at the aft end of the vehicle;

aft hitch means carried by the forward portion of the trailer including a plurality of second attachment members located substantially at the forward end of the trailer;

the first attachment members being located substantially in a generally upright and laterally extending plane at predetermined upper and lower levels, with at least one member at one level and at least two members at the other level;

the second attachment members being located substantially in a generally upright and laterally extending plane at predetermined upper and lower levels, with at least one member at one level and at least two members at the other level arranged in a pattern to correspond generally with the pattern arrangement of the first attachment members;

the vertical distance between the two levels of the second members being substantially greater than the vertical distance between the two levels of the first members;

and a multiple tow bar linkage extending between the trailer and the towing vehicle including upper and lower elongate bars extending longitudinally between corresponding first and second attachment members and pivotally secured thereto at their opposite ends to lie in two vertically spaced lateral planes converging forwardly from the trailer to the towing vehicle;

the difference in vertical distance between the two levels of the second and first attachment members being so selected that the lateral planes containing the tow bars converge forwardly to meet at a line adjacent to the vertical plane containing the lateral axis of the rear axle of the towing vehicle;

and all of the attachment members being so located vertically and laterally that all of the tow bars connected thereto converge forwardly and their extended axes substantially meet at a location generally coincident with the longitudinal axis of the towing vehicle and with the line of juncture of the lateral planes containing the tow bars when the two vehicles are in fore and aft alignment to define a virtual pivot point for vertical and lateral swinging adjacent to the rear axle of the towing vehicle;

in which a plurality of longitudinally extending mounting members are arranged beneath the towing vehicle;

the forward end of each mounting member being secured to the under side of the vehicle aft of and adjacent to the rear axle for swinging laterally only about a generally vertical axis;

at least one of the first attachment members being connected to the aft end of each mounting member rearward of the aft end of the vehicle;

and the forward end of one of the tow bars being connected to each of the attachment members for swinging vertically only about a horizontal axis.

3. Apparatus as claimed in claim 2; in which the axis of the pivotal connection for the forward end of each mounting member is tilted to extend upward and forward to cause the mounting member to extend upward and rearward and provide clearance for under car obstructions and additional road clearance.

4. Towing apparatus for connecting the forward portion of a trailer mounted on road wheels to the aft portion of a towing vehicle having a laterally extending rear axle located well forward of the aft end of the vehicle and having road wheels connected to the ends of the axle, comprising:

forward hitch means carried by the towing vehicle aft of the rear axle including a plurality of first attachment members located substantially at the aft end of the vehicle;

aft hitch means carried by the forward portion of the trailer including a plurality of second attachment members located substantially at the forward end of the trailer;

the first attachment members being located substantially in a generally upright and laterally extending plane at predetermined upper and lower levels, with at least one member at one level and at least two members at the other level;

the second attachment members being located substantially in a generally upright and laterally extending plane at predetermined upper and lower levels, with at least one member at one level and at least two members at the other level arranged in a pattern to correspond generally with the pattern arrangement of the first attachment members;

the vertical distance between the two levels of the second members being substantially greater than the vertical distance between the two levels of the first members;

and a multiple tow bar linkage extending between the trailer and the towing vehicle including upper and lower elongate bars extending longitudinally between corresponding first and second attachment members and pivotally secured thereto at their opposite ends to lie in two vertically spaced lateral planes converging forwardly from the trailer to the towing vehicle;

the difference in vertical distance between the two levels of the second and first attachment members being so selected that the lateral planes containing the two bars converge forwardly to mmeet at a line adjacent to the vertical plane containing the lateral axis of the rear axle of the towing vehicle;

and all of the attachment members being so located vertically and laterally that all of the tow bars connected thereto converge forwardly and their extended axes substantially meet at a location generally coincident with the longitudinal axis of the towing vehicle and with the line of juncture of the lateral planes containing the tow bars when the two vehicles are in fore and aft alignment to define a virtual pivot point for vertical and lateral swinging adjacent to the rear axle of the towing vehicle; in which a plurality of longitudinally extending mounting members are arranged beneath the trailer;

the aft end of each mounting member being secured to the under side of the trailer well aft of the forward end of the trailer for swinging laterally only about a generally vertical axis;

at least one of the second attachment members being connected to the forward end of each mounting member clear of the forward end of the trailer;

and the aft end of one of the tow bars being connected to each of the attachment members for swinging vertically only about a horizontal axis.

5. Towing apparatus for connecting the forward portion of a trailer mounted on road wheels to the aft portion of a towing vehicle having a laterally extending rear axle located well forward of the aft end of the vehicle and having road wheels connected to the ends of the axle, comprising:

forward hitch means carried by the towing vehicle aft of the rear axle including a plurality of first attachment members located substantially at the aft end of the vehicle;

aft hitch means carried by the forward portion of the trailer including a plurality of second attachment members located substantially at the forward end of the trailer;

the first attachment members being located substantially in a generally upright and laterally extending plane at predetermined upper and lower levels, with at least one member at one level and at least two members at the other level;

the second attachment members being located substantially in a generally upright and laterally extending plane at predetermined upper and lower levels, with at least one member at one level and at least two members at the other level arranged in a pattern to correspond generally with the pattern arrangement of the first attachment members;

the vertical distance between the two levels of the second members being substantially greater than the vertical distance between the two levels of the first members;

and a multiple tow bar linkage extending between the trailer and the towing vehicle including upper and lower elongate bars extending longitudinally between corresponding first and second attachment members and pivotally secured thereto at their opposite ends to lie in two vertically spaced lateral planes converging forwardly from the trailer to the towing vehicle;

the difference in vertical distance between the two levels of the second and first attachment members being so selected that the lateral planes containing the tow bars converge forwardly to meet at a line adjacent to the vertical plane containing the lateral axis of the rear axle of the towing vehicle;

and all of the attachment members being so located vertically and laterally that all of the tow bars connected thereto converge forwardly and their extended axes substantially meet at a location generally coincident with the longitudinal axis of the towing vehicle and with the line of juncture of the lateral planes containing the tow bars when the two vehicles are in fore and aft alignment to define a virtual pivot point for vertical and lateral swinging adjacent to the rear axle of the towing vehicle, the tow bars being free of restraint against vertical and lateral swinging movement; in which the towing vehicle is provided with a standard tubular hitch frame extending longitudinally beneath the aft portion of the vehicle and secured to the under side thereof generally parallel to its longitudinal axis;

and a supporting bracket has a forwardly extending mounting shaft adapted to telescope within the hitch frame and be secured thereto;

the first attachment members being mounted on the bracket in vertically and laterally spaced relation.

6. Apparatus as claimed in claim 5; in which the supporting bracket comprises a transverse bar extending laterally to each side of the mounting shaft and a central vertically extending mast;

and one attachment member is secured to each end of the bar and to the upper end of the mast.

* * * * *